Oct. 4, 1955  A. C. ALLEN  2,719,604
METHOD AND APPARATUS FOR GENERATING LUBRICATING OIL MIST
Filed March 2, 1954
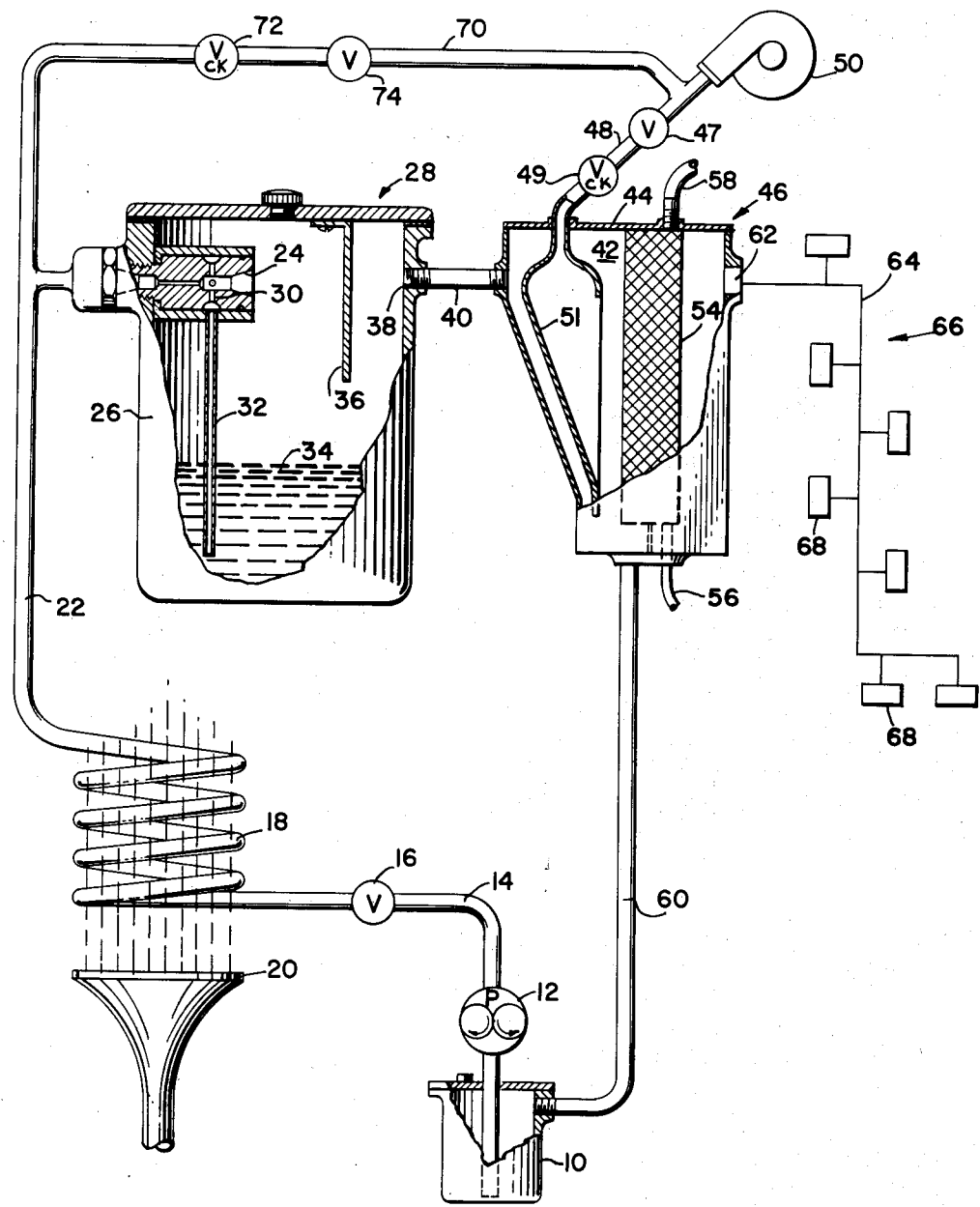
INVENTOR.
Arthur C. Allen
BY
Ahlberg, Küpper & Gradolph
Attorneys.

United States Patent Office 2,719,604
Patented Oct. 4, 1955

2,719,604

METHOD AND APPARATUS FOR GENERATING LUBRICATING OIL MIST

Arthur C. Allen, Chicago, Ill., assignor to Stewart-Warner Corporation, Chicago, Ill., a corporation of Virginia Application March 2, 1954, Serial No. 413,581

15 Claims. (Cl. 184—55)

The present invention relates to centralized, oil mist lubricating systems and more particularly to an improved method and apparatus for generating a mist or aerosol of lubricating oil particles for distribution by such systems.

It is desirable in many oil mist lubricating installations that the aerosol distributed through the system be quite rich in oil content. Frequently an oil mist of the desired richness cannot be produced by conventional mist generating apparatus. The maximum richness of mist produced by such apparatus is limited by the inherent characteristics of fluid mechanics involved in the operation of the nozzles used in generating the mist. However, a given mass of air is capable of supporting more atomized oil than can be atomized properly with the same quantity of air using conventional mist generating methods and apparatus.

One object of the invention is to provide for use with oil mist lubricating systems a novel method and apparatus for producing a lubricating aerosol of finely divided oil particles having an oil richness that can be controllably increased substantially to the limit of the ability of the air to support the oil particles. A related object is to provide a novel oil mist generating method and apparatus of this character in which the richness of the aerosol produced can be controlled independently of the inherent operating limitations of the mist generating structure used in atomizing the oil.

A more specific object is to provide for centralized oil mist lubricating systems a novel method and apparatus for producing a mist of lubricating oil in which at least a portion of the gas used in atomizing the oil is removed from the mist formed to increase the ratio of oil to the gas remaining in the mist.

Other objects and advantages will become apparent from the following description of method and apparatus incorporating the invention. In the attached drawing the single figure shown is a generally schematic view, partially in section, of mist producing apparatus constructed in accordance with the invention.

As shown, the exemplary apparatus used in practicing the invention comprises a reservoir 10 for a volatile fluid, such as ethyl alcohol. The volatile fluid is pumped by a suitable pump 12 through a conduit 14 and a control valve 16 to the inlet of an evaporator 18. The evaporator 18 is heated by a burner 20 or other suitable heat source to evaporate the volatile fluid to the gaseous state under pressure.

The outlet of the evaporator 18 is connected through a conduit 22 to the inlet of a mist generating venturi nozzle 24 housed in the casing 26 of a mist generator 28. The nozzle 24 is supplied with lubricating oil through radial bores 30 in the nozzle connected by a suction tube 32 with an oil reservoir 34 in the lower end of the generator casing 26. The nozzle 24 has substantially the same construction as mist generating nozzles used in conventional oil mist generators.

The mist issuing from the nozzle 24 flows around a baffle 36 to the outlet 38 of the generator 28. The larger droplets of oil in the mist collect on the baffle 36 and drop back into the reservoir 34. A conduit 40 connected to the generator outlet 38 carries the mist to a mixing and condensing chamber 42 formed in one side of the casing 44 of a separator 46. In the chamber 42 the mist is mixed with air supplied to the chamber through a control valve 47, a check valve 49, and conduit 48 leading from a suitable source of air under pressure, such as a blower or compressor 50. Suitable baffling 51 is used in the chamber 42 to aid in mixing the air with the mist.

From the chamber 42, the mist of atomized oil suspended in the mixture of volatilized fluid and air passes through the separator 46, which is designed to remove the volatilized fluid component of the mist by condensing the vapor back to its liquid state. For this purpose a vertical condenser 54 is centrally mounted in the separator casing 44. A suitable coolant such as tap water is passed through the condenser 54 from an inlet 56 in the lower end of the condenser to an outlet 58 in the upper end of the condenser.

As the mist passes through the condenser 54 the volatilized fluid used in initially generating the mist collects on the heat transfer structure of the condenser and runs down into the lower end of the separator casing 44 to flow through a conduit 60 back to the reservoir 10. The atomized particles of lubricating oil remain suspended in the air component of the mist.

The mist outlet 62 in the separator is connected to the distributing conduits 64 of a centralized lubricating system 66 for distribution to lubricating fittings 68.

The ratio of oil to air in the mist supplied to the distributing conduits 64 can be increased up to the maximum capacity of the air to support the lubricating oil in mist form by regulating the rate at which air is added through the control valve 47 in relation to the rate at which oil is atomized in the generator 28. The characteristics of fluid mechanics which inherently limit the oil richness of the mist as it is generated by the nozzle 24 do not limit the oil richness of the mist remaining after the volatilized fluid used in generating the mist has been recovered from the mist.

The apparatus shown provides also for a variation of the method used in producing an oil rich mist. This variation comprises the addition of air at a controlled rate to the volatilized fluid supplied from the evaporator 18 and using the gaseous mixture to atomize oil in the generator 28.

As shown, the source of air under pressure 50 is connected through a conduit 70 and a check valve 72 with the conduit 22 leading from the evaporator 18 to the inlet of the mist generating nozzle 24. The rate at which air is added to the volatilized fluid supplied to the generator is regulated by a control valve 74 in the conduit 70.

If desired, the entire air content of the mist produced for the attached lubricating system 66 may be supplied through the conduit 70 and run through the mist generators 28 to be used as a mist generating medium along the volatilized fluid supplied from the evaporator 18. For this condition of operation, the control valve 47 may be closed as it would not be necessary to add air to the mist output of the generator 28. However, the system is sufficiently flexible to permit a portion of the air to be added to the volatilized fluid for passage through the generator 28 with the remainder of the air component being added to the mist output of the generator to support the atomized oil particles after separation of the volatile fluid component of the mist. Under such conditions, both control valves 47 and 74 would be at least partially open.

To briefly review the improved method of producing a mist rich in lubricating oil, the oil is atomized by a gaseous medium having a volume considerably larger under similar conditions than that of the air component of the mist, as supplied for use in an attached lubricating system. The gaseous medium used in atomizing the oil is composed in part at least of volatilized fluid that is later removed from the mist. The atomized oil particles remain suspended in air that is added either to the volatilized fluid for passage through the mist generator or to the mist formed by means of the volatilized fluid.

The ratio of oil to air in the mist produced may be controlled within the capacity of the air to support the suspended oil particles by regulating the rate at which air is mixed with the volatilized fluid either before or after it is used in atomizing the oil.

While I have shown and described a preferred embodiment of my invention, it will be apparent that variations and modifications thereof may be made without departing from the principles and scope of the invention. I therefore desire, by the following claims, to include all such variations and modifications by which substantially the results of my invention may be obtained through the use of substantially the same or equivalent means.

I claim:

1. The method of producing an oil rich aerosol of lubricating oil comprising the transformation of a volatile fluid into a gaseous state under pressure, atomizing lubricating oil by means of the gaseous fluid, adding air under pressure to the mist of atomized oil, and condensing the volatilized fluid from the mixture thus formed leaving a rich mist of oil suspended in air.

2. The method of producing for centralized lubricating systems an aerosol of lubricating oil in which the ratio of oil to air can be varied over an extremely wide range, comprising, the volatilization of a fluid mist generating medium, atomizing lubricating oil by means of the volatilized fluid, adding air to the mist thus produced at a rate controlled independently of the rate at which the mist is produced, and collecting the volatilized mist generating medium from the mixture thus leaving the oil particles suspended in the air.

3. The method of producing an oil mist comprising, supplying a volatile fluid under pressure in the gaseous state, using the volatilized fluid to generate a mist of oil, adding to the mist thus produced a volume of air less than the volume under similar conditions of the volatilized fluid used in producing the mist, and condensing the volatilized fluid from the mist, leaving an aerosol of finely divided oil particles suspended in the added air.

4. The method of producing for a lubricating system an oil rich aerosol of lubricating oil, comprising, producing a mist of atomized oil particles in a mixture of air and volatilized fluid by atomizing the oil using a gaseous medium at least a portion of which is formed by volatilized fluid, and removing from the mist the volatilized fluid component leaving an oil rich mixture of the atomized lubricating oil particles suspended in the air.

5. The method of producing an oil rich mist of oil comprising, the evaporation of a volatile fluid, the generation of an oil mist using a gaseous medium at least a portion of which is composed of the volatilized fluid, adding a gas to the volatilized fluid, and separating the volatilized fluid from the mist generated leaving the atomized oil particles of the mist suspended in the added gas.

6. The method of producing an oil mist rich in oil comprising, supplying of volatilized fluid in the gaseous state, adding air to the volatilized fluid, using the mixture of air and volatilized fluid to generate an oil mist, and separating the volatilized fluid from the oil mist leaving the atomized oil particles suspended in the air.

7. The method of producing an oil rich aerosol of atomized oil, comprising, the evaporation of a fluid, mixing a gas with the evaporated fluid, generating a mist of lubricating oil using the mixture of evaporated fluid and gas, and collecting the evaporated fluid leaving the atomized oil suspended in the gas.

8. The method of producing an oil rich mist of lubricating oil, comprising, the evaporation of a volatile fluid, adding air to the volatilized fluid, passing the mixture of volatilized fluid and air through a mist generating nozzle supplied with oil to produce a mist of atomized oil particles suspended in a mixture of air and volatilized fluid, and collecting the volatilized fluid from the mist thus formed, leaving the oil particles suspended in the air component of the mist.

9. The method of producing an aerosol for oil mist lubricating systems, comprising, the evaporation of a volatile fluid, passing the fluid in the gaseous state through a mist generating nozzle supplied with lubricating oil to generate a mist of the oil, adding a gas to the mist thus produced, and condensing out the volatilized fluid from the mixture, leaving the atomized particles of lubricating oil supported in the added gas.

10. The method of producing an oil mist comprising, the evaporation of a volatile fluid, passing the volatilized fluid through a mist generating nozzle supplied with oil to atomize the oil, adding air to the mist thus produced, and passing the mixture of air, volatilized fluid, and atomized lubricating oil through a separator to remove the volatilized fluid, leaving a mist of finely divided lubricant particles suspended in air.

11. Apparatus for generating an oil rich mist of lubricating oil comprising, in combination, means for supplying a volatilized fluid under pressure, means for generating a mist of lubricating oil using the volatilized fluid under pressure, means for adding air under pressure to the mist thus formed, and means for removing the volatilized fluid from the mist leaving the atomized oil particles suspended in the air.

12. Apparatus for producing an oil rich aerosol of lubricating oil for use in a centralized lubricating system comprising, in combination, an evaporator for a volatile fluid, a mist generator including a mist generating nozzle connected to the outlet of the evaporator, means in the generator for supplying lubricating oil to the nozzle, means for commingling air under pressure with the mist output from the nozzle, and a separator connected with the outlet of the generator for removing the volatilized fluid component from the mist to leave a mist of atomized oil particles suspended in air.

13. Apparatus for producing an oil rich aerosol of lubricating oil comprising, in combination, an evaporator for volatile fluid, means for applying pressure to the volatilized fluid, a mist generator connected with the outlet of the evaporator for generating an oil mist, means connected to add air to the volatilized fluid, and a separator connected to the generator to remove the volatilized fluid component of the mist formed by the generator leaving the atomized oil particles thereof suspended in a medium of air.

14. Apparatus for generating an oil mist rich in oil, comprising, in combination, means for evaporating a volatile fluid, means for adding air to the volatilized fluid, a mist generator including a mist generating nozzle interconnected to receive the mixture of air and volatilized fluid, means in the generator for supplying oil to the nozzle, and a separator connected to the output of the generator to remove the volatilized fluid component of the mist formed in the generator, leaving the atomized oil droplets suspended in air.

15. Apparatus for generating an oil mist rich in oil comprising, in combination, an evaporator, means for supplying a volatile fluid to the evaporator, an oil mist generator connected to the outlet of the evaporator, means for adding a gas to the fluid volatilized in the evaporator, means for controlling the rate at which the gas is added to the volatilized fluid, and means connected to the generator for removing from the mist formed therein the volatilized fluid component thereof, leaving the atomized oil particles suspended in the added gas.

References Cited in the file of this patent

UNITED STATES PATENTS 2,080,420   Havekost et al. _____ May 18, 1937